US011560065B2

(12) United States Patent
Annampedu (10) Patent No.: US 11,560,065 B2
(45) Date of Patent: Jan. 24, 2023

(54) METHOD AND APPARATUS TO MANAGE ELECTRIC VEHICLE CHARGING STATIONS AND PARKING SPACES

(71) Applicant: Akshaya Annampedu, Plano, TX (US)

(72) Inventor: Akshaya Annampedu, Plano, TX (US)

(*) Notice: Subject to any disclaimer, the term of this patent is extended or adjusted under 35 U.S.C. 154(b) by 208 days.

(21) Appl. No.: 17/146,490

(22) Filed: Jan. 11, 2021

(65) Prior Publication Data

US 2021/0129703 A1 May 6, 2021

(51) Int. Cl.
*B60L 53/65* (2019.01)
*B60L 53/30* (2019.01)

(52) U.S. Cl.
CPC ............ *B60L 53/65* (2019.02); *B60L 53/305* (2019.02); *B60L 2250/10* (2013.01)

(58) Field of Classification Search
CPC ..... B60L 53/65; B60L 53/305; B60L 2250/10
See application file for complete search history.

(56) References Cited

U.S. PATENT DOCUMENTS

| | | | | |
|---|---|---|---|---|
| 6,081,205 | A * | 6/2000 | Williams | B60L 53/14 340/932.2 |
| 8,717,170 | B1 * | 5/2014 | Juhasz | B60L 53/63 340/5.2 |
| 9,472,045 | B2 * | 10/2016 | Halnais | G07F 17/246 |
| 10,500,977 | B2 * | 12/2019 | Anzicek | B60L 53/14 |
| 10,525,845 | B2 * | 1/2020 | Pursifull | B60L 53/65 |

* cited by examiner

*Primary Examiner* — Richard V Muralidar (57) ABSTRACT

Electric vehicle charging stations are in high demand, as the number of electric vehicles on the road is rising. A novel method and apparatus invention effectively manages the charging station parking space by detecting and taking action on ineligible vehicles that are parked for a long time without charging so that others can use the spot. The invention employs multiple ultrasonic sensors to see if the parking space is occupied or not, and a current sensor to see if the parked vehicle is drawing current through the charging cable or not. Depending on those two outcomes, the invention adopts a monitoring process using audio-visual alarm devices and a communication device to notify parking authorities to take action if the parked vehicle is deemed ineligible. The invention also explains the calibration process of ultrasonic sensors for detecting the presence or absence of a vehicle in the parking space.

18 Claims, 10 Drawing Sheets

METHOD AND APPARATUS TO MANAGE ELECTRIC VEHICLE CHARGING STATIONS AND PARKING SPACES

BACKGROUND OF THE INVENTION

The present invention relates generally to the field of automotive industry, and more particularly, to electric vehicle and charging station manufactures and parking authorities for efficient use and management of charging station parking spaces that are meant to be used only for charging eligible electric vehicles and to be freed up after charging of those vehicles are complete.

The number of electric vehicles on the roads today have increased dramatically in the recent past and the industry is expected to grow much more rapidly in the near future. Electric vehicle manufacturers, like Tesla Inc., have established their own worldwide network of electric charging stations in various cities at critical locations. This network of charging stations enables electric vehicle owners to overcome the range anxiety—that is, the fear of running out of electrical charge in their vehicle's batteries while going on a long road trip. Also, some owners may prefer to charge their electric vehicles in those public charging stations because it is usually faster and may be cost effective compared to charging stations in the home. Although the network of charging stations is growing, the number of charging stations at a given location is still very limited due to the cost of establishing them. With the increasing number of electric vehicles on use today, one of the key problems is to efficiently manage the charging stations for the electric vehicle owners. It is extremely important to free up the charging station parking space as soon as the charging is complete for an electric vehicle, so that other vehicles waiting in line can have their turn quickly. Some charging stations, like the superchargers established by Tesla Inc., charges a penalty fee if a vehicle manufactured by Tesla is parked for an extended period after the charging is complete. This solution works only for vehicles manufactured by Tesla Inc. and only for those Tesla vehicles that are plugged in to the charging station. If any electric or normal gasoline powered non-electric vehicle is parked in a charging station space due to crowds or other reasons and not plugged in to the charging station, there is no efficient way to detect the problem and free up the parking space for others. This is a huge problem as the crucial charging station spaces that could be used by other people needing to charge their electric vehicles are now wasted and not useful for others. The problem gets drastically worse in busy and highly populated cities where the number of electric vehicles on the road far exceeds the number of available charging stations.

Therefore, a need exists for a method and apparatus for detecting and taking action on electric and non-electric vehicles that are parked on electric vehicle charging station spaces for an extended period of time without using the charging amenities.

BRIEF SUMMARY OF THE INVENTION

A method and apparatus are provided in this present invention to detect and take action on electric and non-electric vehicles that are parked on electric vehicle charging station spaces for an extended period of time without using the charging amenities.

The present invention employs multiple ultrasonic sensors that are installed in the electric charging stations, and/or on walls, floors, ceilings of a covered parking lot and/or on separate structures that are either attached to or adjacent to the electric charging stations. To increase the efficiency of detection and to reduce false alarms, a plurality of ultrasonic sensors is used and configured to constantly, or in short time intervals, monitor the time lapse between the transmission of ultrasonic pulses from the sensors and the reception of those ultrasonic pulses back to the sensors after possible reflection from a vehicle and/or a plurality of locations in a charging station parking space. Depending on the location of the ultrasonic sensors, some transmitted ultrasonic pulses may or may not get reflected back to the sensors. If the parking space is empty, the time lapse between the transmitting and receiving of those ultrasonic pulses can be measured and known a priori. To contrast, if a vehicle is parked in the parking space, then that time lapse from the same set of sensors covering that parking space will now be different. This is because the ultrasonic pulses from the sensors are now getting reflected from different parts of the parked vehicle as opposed to possibly getting reflected from the reflecting surfaces of the empty parking space. This change in time lapse from multiple ultrasonic sensors are then combined to form a decision on whether a vehicle is parked in a charging station parking space or not.

In parallel with detecting the presence or absence of a vehicle in the charging station parking space, the presence or absence of electric current flow through the charging cable from the charging station is also detected. Electric current, which is measured in Amperes, can be measured using a measuring device called an Ammeter. If the electric charging station is not equipped with such a device, then this invention requires an Ammeter to be installed in series with the charging cable to detect the presence or absence of electric current through the cable. Current will flow in the charging cable only when a multiple of conditions are satisfied and can serve as the single indicator of whether the vehicle is eligible to be parked there or not. Electric current won't flow in the charging cable for a variety of reasons: For example, if the vehicle is a non-electric vehicle, or if the vehicle is an electric vehicle but is not compatible with the charging cable plug type and/or not authorized to charge from this charging station and/or didn't setup proper payment methods for drawing electric power at this location, and/or the battery has been already charged beyond chargeable limits and/or the owner simply parked without attempting to charge the vehicle and so on and so forth. Thus, the presence of an electric current flow through the charging cable is a clear indicator of whether the parked vehicle is eligible to occupy the electric charging parking space or not. If there is no electric current flow through the charging cable, then the parked vehicle is classified as a non-eligible vehicle to be parked there.

Once a non-eligible vehicle is detected to be parked, then the next step of the invention is to start a timer to allow some time for the owner of the vehicle to move the vehicle away from the parking space or to plug in and draw current from the charging station. After the timer expires with the vehicle still being parked with no current flow through the charging cable, it is confirmed that a vehicle has been wrongly parked for an extended period of time. The next step of the invention is to take appropriate action. Action could be a change of color of the status light located at or around the electric charging station itself. The parking authority personnel may then take necessary actions, such as towing, to have the parking space freed up for other users. The parking authority may note the status of the parking spaces during general patrolling around the spaces and/or getting calls from users who are waiting and/or getting called from the charging station itself, if equipped with a wireless or wireline communication device. If the vehicle owner information is available, then the owner may be notified as well to get the car moved from the parking space. If the vehicle has the ability to drive on its own, such as an autonomous self-driving vehicle, then the charging station may also release the charging cable and issue a command for the vehicle to move away from the parking space.

A more complete understanding of the present invention, as well as further features and advantages of the present invention, will be obtained by reference to the following detailed description and drawings.

DETAILED DESCRIPTION OF THE INVENTION

Figure 1:
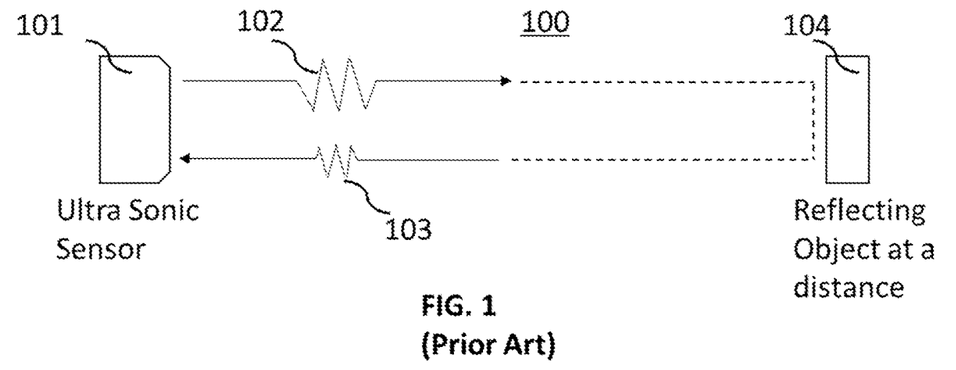
FIG. 1 illustrates the principles behind using ultrasonic sensors to measure distance.

The principles behind the system 100 using ultrasonic sensors to measure distance is illustrated in prior art FIG. 1. An ultrasonic sensor is an instrument used to measure the distance to an object with high reliability using ultrasonic sound waves, also referred to as pulses. The frequency of ultrasonic waves, which is beyond 20,000 Hertz, is much higher than the frequencies of audible sound. An ultrasonic sensor uses a transducer, such as a microphone, to send and receive ultrasonic pulses that relay back information about an object's proximity. In FIG. 1, an ultrasonic sensor 101 emits short, high-frequency sound pulses 102 at regular intervals of time in a periodic manner. These propagate in the air at the velocity of sound, which is 340 meters/second. If they strike an object 104, then they are reflected back as echo signals 103 to the sensor, which itself or with the help of a computer, computes the distance to the target based on the time lapse between emitting the signal and receiving the echo. The distance between the sensor and the target can be calculated as, Distance=(Time Lapse×Speed of Sound)/2. The division by 2 in the formula is because the ultrasonic pulses must travel back and forth from the sensor to target and from the target back to the sensor after reflection. Since distance travelled and the time lapse of the pulse to travel that distance are related, either the change in distance or the time lapse can be used to detect if a target is present or not. In this embodiment, we use the change in time lapse to detect the presence or absence of a vehicle in a parking space. The echo signals 103 may in general be weaker in intensity than the transmitted sound pulses 102 depending on the distance they travel, the reflective properties of the distant object, and/or on the angle of reflection.

Figure 2:
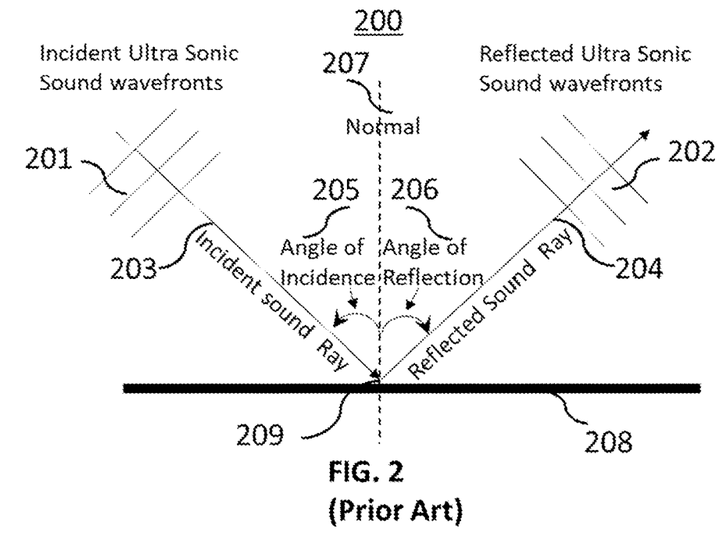
FIG. 2 illustrates the reflection properties of sound waves.

The reflection properties 200 of sound waves are illustrated in prior art FIG. 2. Reflection is the change in the direction of a wavefront at an interface between two different media so that the wavefront returns into the medium from which it originated such as the reflection of light, sound and water waves. The incident ultrasonic sound wavefronts 201 and the reflected wavefronts 202 are shown in FIG. 2. The reflection of sound waves is governed by two laws known as the two laws of sound reflection. The first law of reflection of sound waves is that the angle of incidence 205 equals the angle of reflection 206. The second law of reflection of sound waves is that the incident sound ray 203, the reflected sound ray 204 and the perpendicular line 207 (also known as the normal line) from the point of incidence on the reflecting surface, all lie on the same plane, perpendicular to the reflecting surface 208. The sound ray is the direction of the line propagation of the sound wave. The angle of incidence 205 of the sound ray is the angle between the incident sound ray 203 and the line 207 perpendicular to the reflecting surface 208 at the point of incidence. The angle of reflection 206 of the sound ray is the angle between the reflected sound ray 204 and the line 207 perpendicular to the reflecting surface 208 at the point of incidence 209. When an incident sound ray is perpendicular to a reflecting surface, it reflects onto itself because both the angle of incidence and the angle of reflection equals to 0 degree. Under such a condition, the intensity of the reflected echo will be maximum. Our invention tries to position the ultrasonic sensors such that the emitted sound pulses are perpendicular to a parked vehicle so that a stronger echo signal can be received to detect the presence or an absence of a vehicle.

Figure 3:
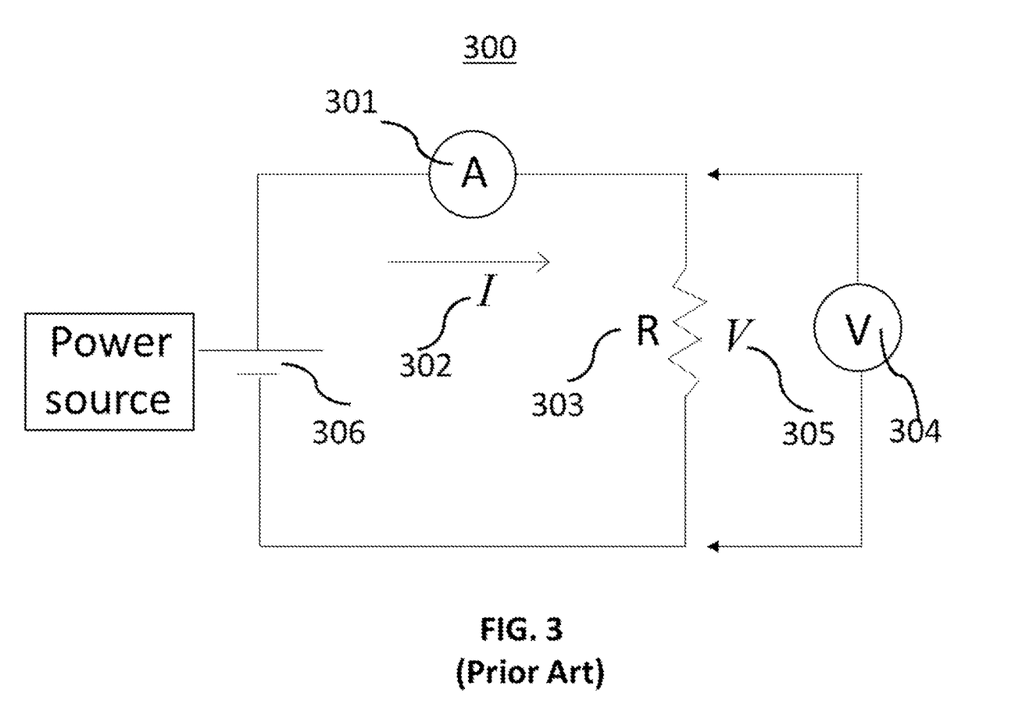
FIG. 3 illustrates the principles behind measuring electric current in an electrical circuit.

The principles behind measuring electric current in an electrical circuit 300 using an ammeter or voltmeter is illustrated in prior art FIG. 3. In this circuit, a power source 306 is connected to a load resistance R 303 with an ammeter 301 in series with R and a voltmeter 304 in parallel to R. An ammeter is an instrument for measuring the electric current 1302 in amperes in a branch of an electric circuit. The ammeter must be placed in series with the measured branch and must have very low resistance to avoid significant alteration of the current it is to measure. By contrast, a voltmeter must be connected in parallel. The value of electrical resistance associated with a circuit element, such as the load resistance R 303, or an appliance can be determined by measuring the voltage V 305 across it with a voltmeter 304 and the current I 302 through it with an ammeter 301 and then dividing the measured voltage by the current. This is an application of the well-known Ohm's law (R=V/I).

Figure 4A:
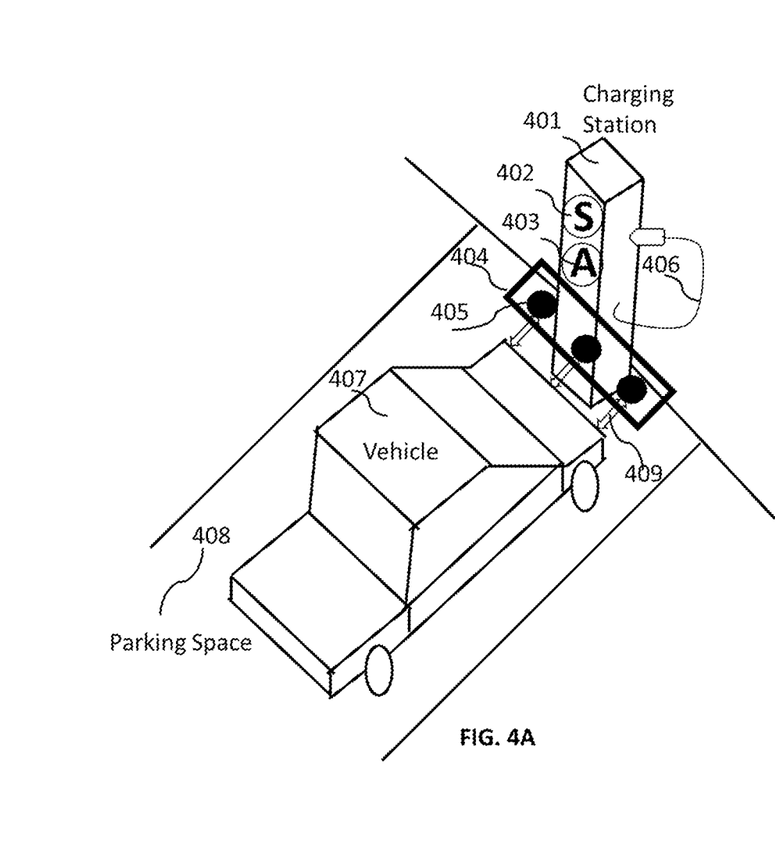
FIGS. 4A and 4B illustrate an embodiment in which the ultrasonic sensors are positioned to beam the ultrasonic pulses parallel to the parking space floor for the cases where a parking space is occupied by a vehicle and for an unoccupied parking space, respectively.
Figure 4B:
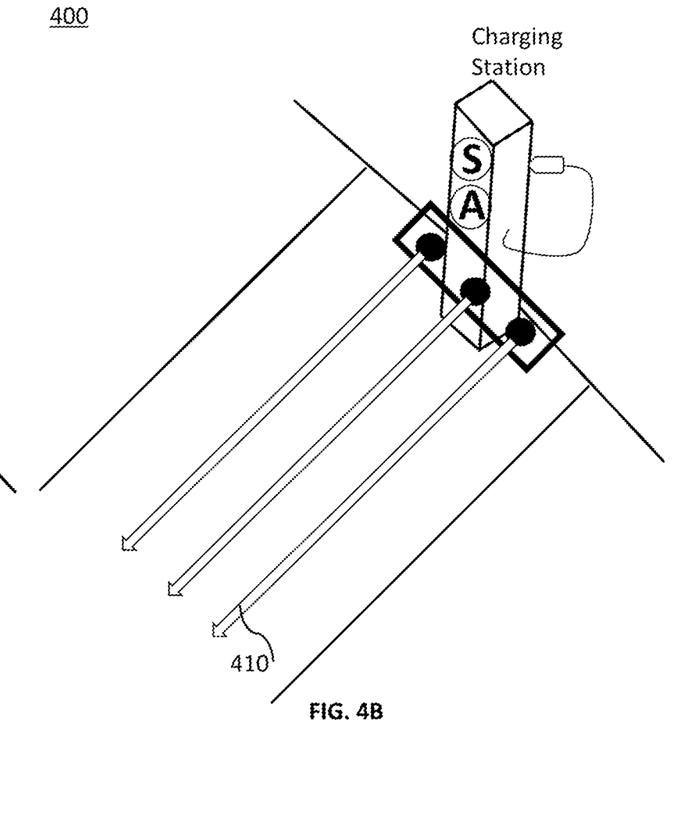

Referring now to the invention in more detail, FIGS. 4A and 4B illustrate an embodiment of a system 400 where the ultrasonic sensors 405 are positioned to beam the ultrasonic pulses 409 and 410 parallel to the parking space floor for the cases where a parking space 408 is occupied by a vehicle 407 and for an unoccupied and empty parking space, respectively. In FIGS. 4A and 4B, it is shown as an example that the three ultrasonic sensors 405 are mounted in some form of a structure 404 that is attached to the charging station 401 as shown. It is to be understood that some or all of the ultrasonic sensors may be directly mounted in the charging station 401 itself. In FIGS. 4A and 4B, the circled S 402, denotes a status indicator which indicates the status of the parking space of the charging station 401. In one embodiment, the status indicator could be different colored lights with a green color meaning that the parking space 408 is available, with a red color meaning that the parking space is occupied for an extended period of time by an ineligible vehicle and with a yellow color meaning a waiting period after which the status turns into red color if no action is taken on the ineligible vehicle to be removed from the parking space. The status indicator 402 could also flash blinking red light in case of system fault or in need of system maintenance. The status indicator 402 may also be designed to sound an audible alarm and/or alert parking authorities, towing companies and/or law enforcement authorities using an alarm device and a wired and/or wireless communication device capable of communication with the authorities. If the owner information is known to the charging station 401, then the charging station may also communicate to the owner by electronic means such as a text message, email, or a telephonic voice call. If the vehicle has the ability to drive on its own, such as an autonomous self-driving vehicle, then the charging station 401 may also release the charging cable 406 and issue a command for the vehicle 407 to move away from the parking space 408. In FIGS. 4A and 4B, the circled A 403, denotes a device called ammeter which measures the flow of electric current in units of Amperes. In FIG. 4A, it is shown for example that the charging cable 406 is not connected to the vehicle 407. In this case for example, there will not be any current flow through the cable 406 irrespective of whether the parked vehicle 407 is an electric vehicle or not. As the ultrasonic sensors 405 detect the presence of a vehicle AND as the ammeter 403 detects the absence of electric current flow through the cable 406 in this case, the parked vehicle will be classified as an ineligible vehicle after a period of time. It can be noted that in FIG. 4A, the ultrasonic pulses 409 emitted from the sensors 405 gets reflected back to the sensors from the parked vehicle and that in FIG. 4B, the ultrasonic pulses 410 do not get reflected back as the parking space is empty. The ultrasonic pulses 410 may get reflected back after a very long time (compared to the short time of reflection for the ultrasonic pulses 409) if there is a very distant reflecting surface. Also, to be noted is that even though the ultrasonic sensors 405 are mounted to beam the ultrasonic pulses parallel to the parking space floor, other embodiments are possible to mount and beam the ultrasonic pulses to hit the floor and/or parked vehicle at different angles.

Figure 5A:
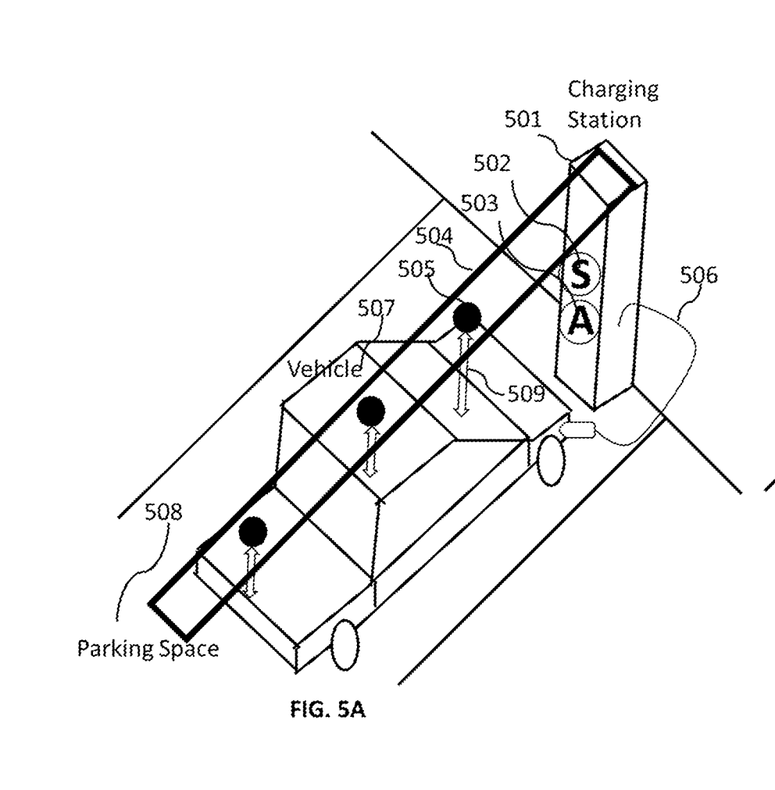
FIGS. 5A and 5B illustrate an embodiment in which the ultrasonic sensors mounted on a structure attached to the top of a charging station are positioned to beam the ultrasonic pulses perpendicular to the parking space floor for the cases where a parking space is occupied by a vehicle and for an unoccupied parking space respectively.
Figure 5B:
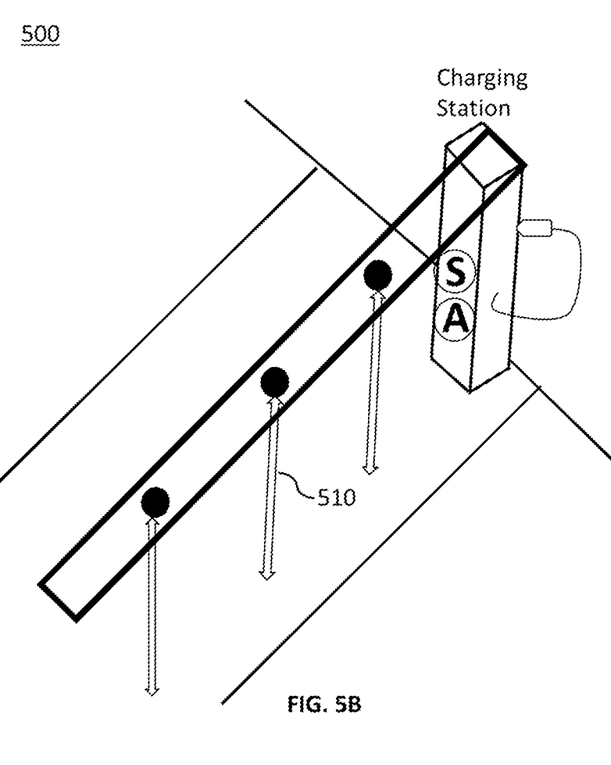

FIGS. 5A and 5B illustrate another embodiment of the invention where the system 500 uses ultrasonic sensors 505, mounted on a structure 504, which are positioned to beam the ultrasonic pulses 509 and 510 perpendicular to the parking space floor for the cases where a parking space 508 is occupied by a vehicle 507 and for an unoccupied and empty parking space respectively. In this embodiment, the ultrasonic sensors 505 are mounted to some structure 504 that is attached to the top of the charging station such that the ultrasonic pulses are pointed downwards towards the parking space floor. As explained before in FIGS. 4A and 4B, the circled S 502, denotes a status indicator which indicates the status of the parking space of the charging station 501 and the circled A 503 denotes an ammeter device to measure current flow through the charging cable 506. In FIG. 5A for example, it is shown that the charging cable 506 is connected to the vehicle 507. In this case for example, there will be current flow through the cable 506 if the parked vehicle 507 is an electric vehicle and satisfies different requirements as explained before to draw current from the charging station 501. It can be noted that in FIG. 5A, the ultrasonic pulses 509 emitted from the sensors 505 gets reflected back to the sensors from the parked vehicle 507 and that in FIG. 5B, the ultrasonic pulses 510 get reflected back from the parking space floor as the parking space was empty. The ultrasonic pulses 509 take a shorter amount of time to get reflected back to the sensors compared to the pulses 510 as the pulses 509 gets reflected from the surfaces of a parked vehicle as opposed to the pulses 510 which needs to travel further to the parking space floor before getting reflected back to the sensors 505. It is to be noted that even though the ultrasonic sensors 505 are mounted to beam the ultrasonic pulses perpendicular to the parking space floor, other embodiments are possible to mount and beam the ultrasonic pulses to hit the floor and/or parked vehicle at different angles.

Figure 6A:
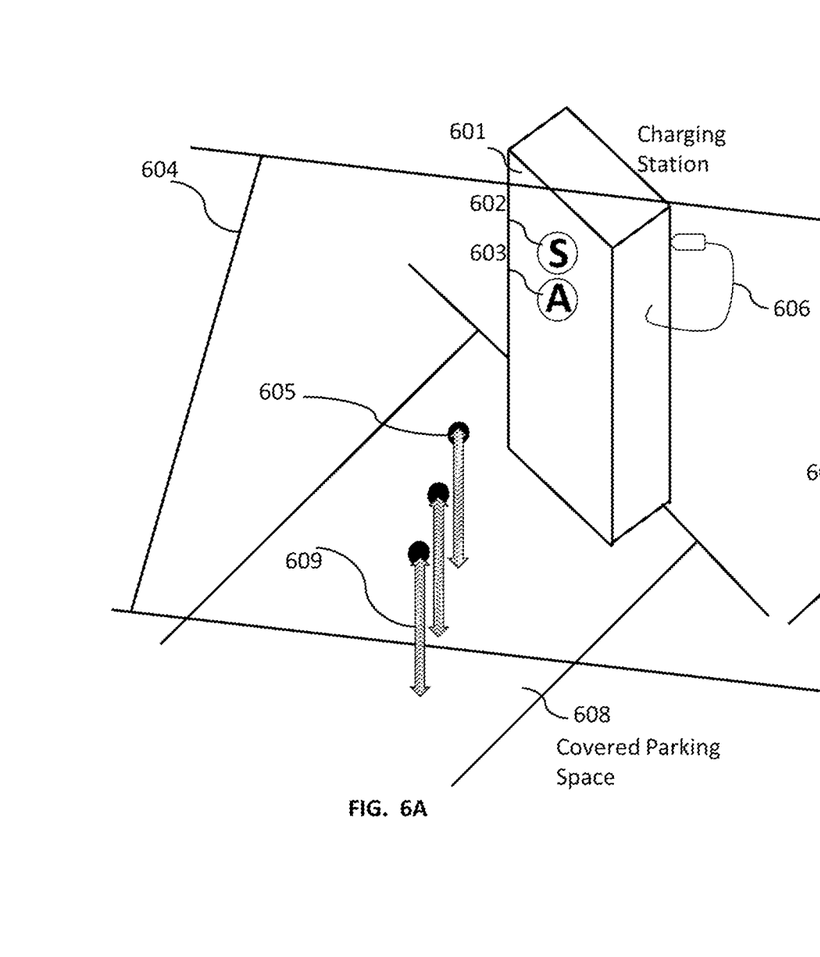
FIGS. 6A and 6B illustrate another embodiment of the invention in which the ultrasonic sensors mounted on the ceiling of a covered parking space are positioned to beam the ultrasonic pulses perpendicular to the parking space floor for the cases where a parking space is unoccupied and for a parking space that is occupied by a vehicle, respectively.
Figure 6B:
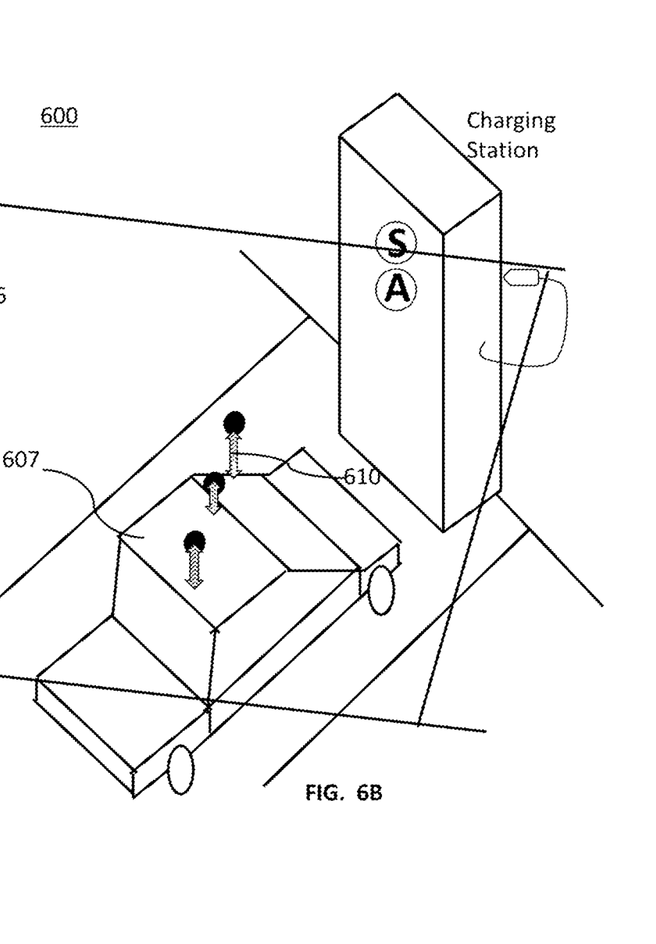

FIGS. 6A and 6B illustrate another embodiment of the invention where the system 600 uses ultrasonic sensors 605, mounted on the ceiling 604 of a covered parking space, which are positioned to beam the ultrasonic pulses 609 and 610 perpendicular to the parking space floor for the cases where a parking space 608 is unoccupied and empty and for a parking space that is occupied by a vehicle 607, respectively. As explained before in FIGS. 4A and 4B, the circled S 602, denotes a status indicator which indicates the status of the parking space of the charging station 601 and the circled A 603 denotes an ammeter device to measure current flow through the charging cable 606. It can be noted that in FIG. 6A, the ultrasonic pulses 609 emitted from the sensors 605 get reflected back to the sensors from the empty parking space and that in FIG. 6B, the ultrasonic pulses 610 get reflected back from the surfaces of a parked vehicle 607. The ultrasonic pulses 609 take a longer amount of time to get reflected back to the sensors compared to the pulses 610 as the pulses 609 gets reflected from the parking space floor as opposed to the pulses 610 which gets reflected back to the sensors 605 sooner from the surfaces of a parked vehicle 607. It is to be noted that even though the ultrasonic sensors 605 are mounted to beam the ultrasonic pulses perpendicular to the parking space floor, other embodiments are possible to mount and beam the ultrasonic pulses to hit the floor and/or parked vehicle at different angles.

Figure 7A:
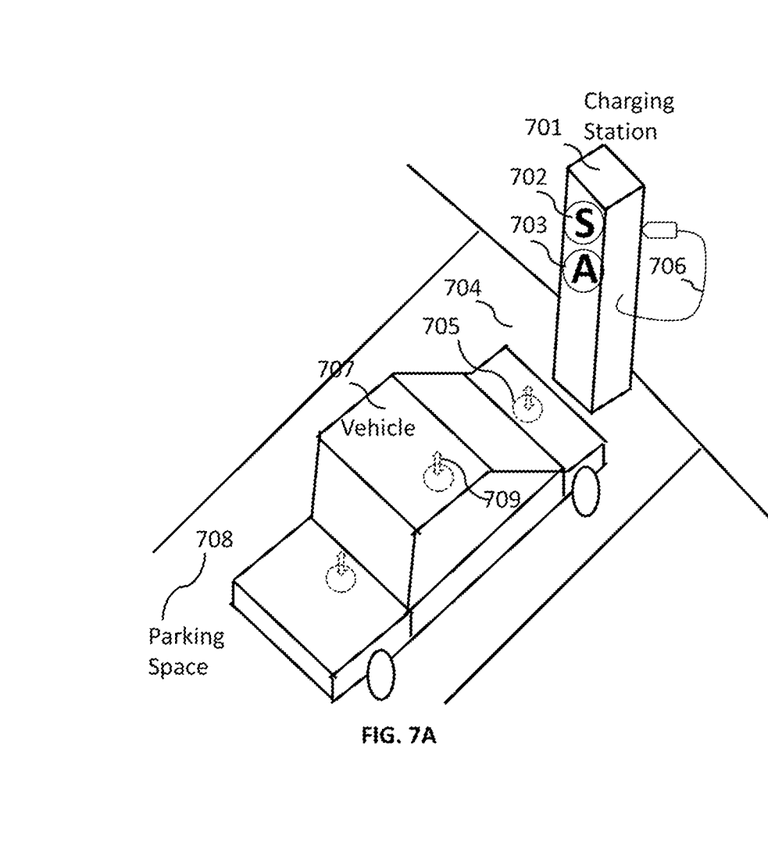
FIGS. 7A and 7B illustrate another embodiment of the invention in which the ultrasonic sensors mounted on the parking space floor are positioned to beam the ultrasonic pulses perpendicular to the parking space floor for the cases where a parking space is occupied by a vehicle and for an unoccupied parking space, respectively.
Figure 7B:
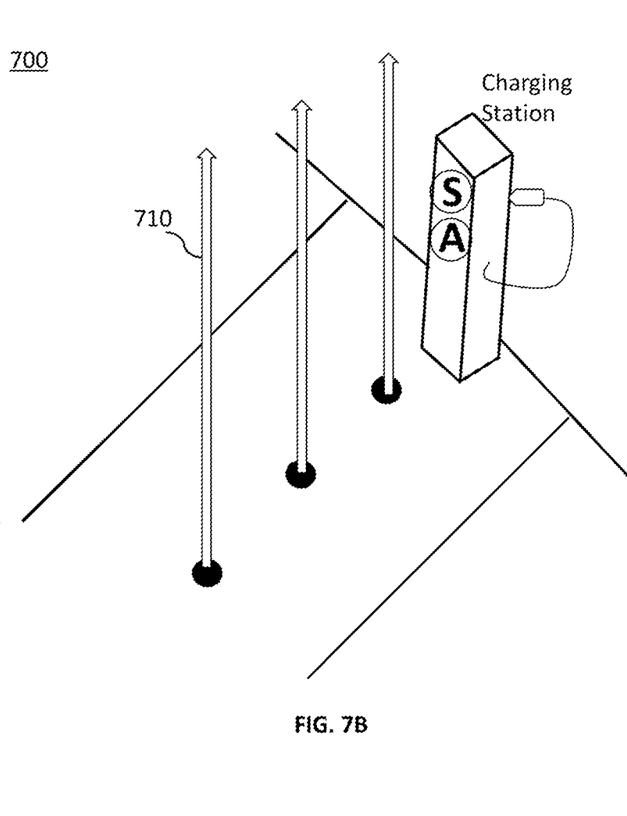

FIGS. 7A and 7B illustrate another embodiment of the invention where the system 700 uses ultrasonic sensors 705, mounted on the parking space floor 704, which are positioned to beam the ultrasonic pulses 709 and 710 perpendicular to the parking space floor for the cases where a parking space 708 is occupied by a vehicle 707 and for an unoccupied and empty parking space, respectively. As explained before, in FIGS. 4A and 4B, the circled S 702, denotes a status indicator which indicates the status of the parking space of the charging station 701 and the circled A 703 denotes an ammeter device to measure current flow through the charging cable 706. It can be noted that in FIG. 7A, the ultrasonic pulses 709 emitted from the sensors 705 get reflected back to the sensors from the underside of a parked vehicle 705 and that in FIG. 7B, the ultrasonic pulses 710 do not get reflected back as the parking space was empty and there is no surface, in this embodiment, to reflect the pulses 710 back to the sensors 705. If a ceiling is present such as in a covered parking space, then the ultrasonic pulses 710 would have been reflected from the ceiling surface and would have taken a longer amount of time to get reflected back to the sensors 705 compared to pulses 709. It is to be noted that even though the ultrasonic sensors 705 are mounted to beam the ultrasonic pulses perpendicular to the parking space floor, other embodiments are possible to mount and beam the ultrasonic pulses to hit the parked vehicle at different angles.

Figure 8A:
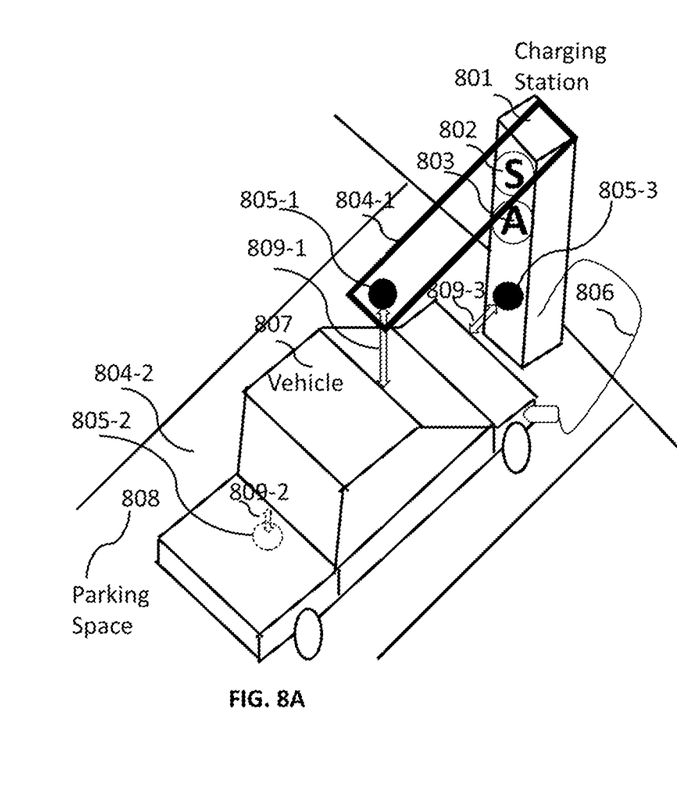
FIGS. 8A and 8B illustrate another embodiment of the invention in which some ultrasonic sensors are positioned to beam the ultrasonic pulses perpendicular to the parking space floor and some ultrasonic sensors are positioned to beam the ultrasonic pulses parallel to the parking space floor for the cases where a parking space is occupied by a vehicle and for an unoccupied parking space respectively.
Figure 8B:
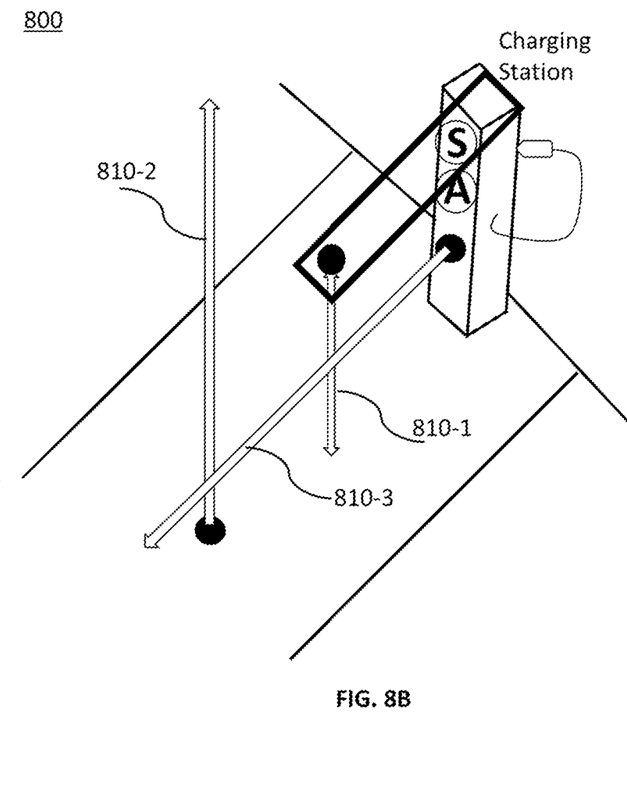

FIGS. 8A and 8B illustrate another embodiment of the invention where some ultrasonic sensors 805-1 and 805-2 are positioned to beam the ultrasonic pulses 809-1, 809-2, 810-1 and 810-2 perpendicular to the parking space floor and some ultrasonic sensors 805-3 are positioned to beam the ultrasonic pulses 809-3 and 810-3 parallel to the parking space floor for the cases where a parking space 808 is occupied by a vehicle 807 and for an unoccupied and empty parking space respectively in the system 800. As shown in FIGS. 8A and 8B, the ultrasonic sensor 805-1 is mounted on some structure 804-1 that is attached to the charging station 801, the ultrasonic sensor 805-2 is mounted on the parking space floor 804-2, and the ultrasonic sensor 805-3 is mounted on the charging station 801 itself. As explained before, in FIGS. 4A and 4B, the circled S 802, denotes a status indicator which indicates the status of the parking space of the charging station 801 and the circled A 803 denotes an ammeter device to measure current flow through the charging cable 806. It can be noted that in FIG. 8A, the ultrasonic pulses 809-1, 809-2 and 809-3 emitted from the sensors 805-1, 805-2 and 805-3 gets reflected back to the sensors from the top, the underside and from the front side of a parked vehicle 807, respectively. In FIG. 8B, the ultrasonic pulses 810-1 gets reflected from the parking space floor but the ultrasonic pulses 810-2 and 810-3 do not get reflected back to the sensors as the parking space was empty. It is to be noted that even though some of the ultrasonic sensors are mounted to beam the ultrasonic pulses perpendicular to the parking space floor and some others to beam parallel to the floor, other embodiments are possible to mount and beam the ultrasonic pulses to hit the floor and/or parked vehicle at different angles.

Figure 9:
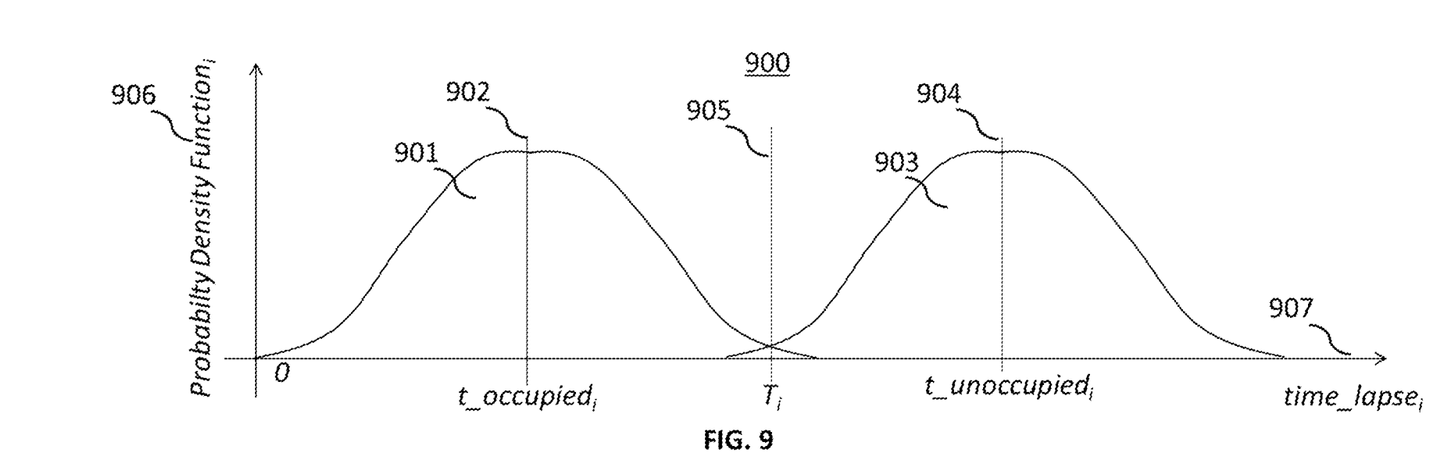
FIG. 9 illustrates a method for initial calibration of the time lapses of ultrasonic pulses from the sensors for the cases where a parking space is occupied by a vehicle and for an unoccupied parking space, respectively. Even when the parking space is unoccupied, the ultrasonic pulses still get reflected from the parking space surfaces in this figure.
Figure 10:
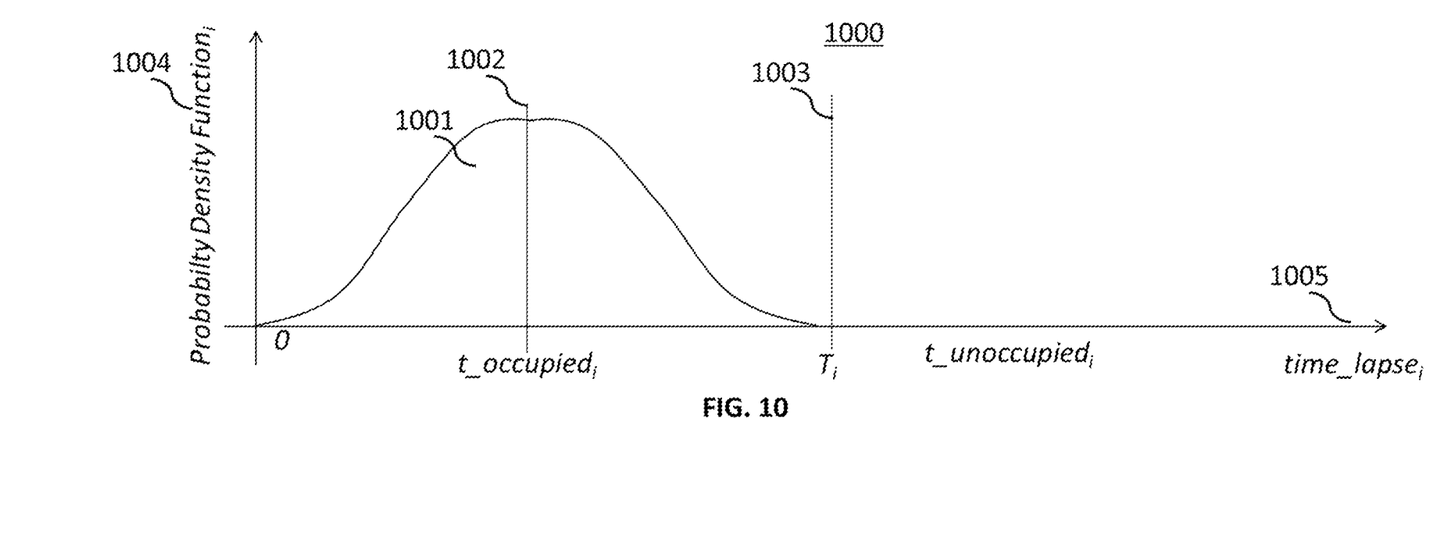
FIG. 10 illustrates a method for initial calibration of the time lapses of ultrasonic pulses from the sensors for the cases where a parking space is occupied by a vehicle and for an unoccupied parking space, respectively. When the parking space is unoccupied, the ultrasonic pulses do not get reflected back to the sensors in this figure, due to the lack of surrounding surfaces for reflection.

Initially, the time lapses of ultrasonic pulses from the sensors for the said parking space are measured and calibrated for both the cases of the said parking space being occupied by a vehicle and for the case that the space being empty and unoccupied. A method of this initial calibration is illustrated in FIGS. 9 and 10 for two different scenarios 900 and 1000. Let N denote the number of ultrasonic sensors that are transmitting ultrasonic pulses to and receiving them after reflections from different surfaces in a particular charging station's parking area. In FIG. 9, Let t_unoccupied$_i$ 904 denote the mean (average) time lapse of ultrasonic pulses from ultrasonic sensor i_after reflection from some surface, when the said parking space is unoccupied, averaged over many times. Since there are N sensors, the range of possible values of i is 1, 2, 3, . . . , N. Let t_occupied$_i$ 902 denote the mean (average) time lapse of ultrasonic pulses from the ultrasonic sensor i after reflection from some surfaces of a parked vehicle, when the said parking space is occupied, averaged over many times, and preferably with many different types of vehicles. An example of the corresponding probability density functions of the time lapses for the two cases 901 and 903 are illustrated in FIG. 9 with probability density function of sensor i plotted along Y-axis 906 and with time lapse 907 in sensor i plotted long the X-axis. As known in the theory of probability and statistics, a probability density function (PDF), is a function whose value at any given sample (or point) in the sample space (the set of possible values taken by the random variable) can be interpreted as providing a relative likelihood that the value of the random variable would equal that sample. A value for threshold 905 $T_i$, is then chosen for ultrasonic sensor i, that is in between t_unoccupied$_i$ 904 and t_occupied$_i$ 902, preferably (but not necessarily) midway of t_unoccupied$_i$ and t_occupied$_i$, to decide whether a vehicle is parked or not in that parking space based on the information from that particular ultrasonic sensor i. The idea is that when the measured time lapse is less than the threshold $T_i$, then it can be said with high level of confidence that the said parking space is occupied by a vehicle. The decision could be made even more robustly by combining decisions from each of the available N sensors to make a final decision on the presence or absence of a vehicle in the parking space of that charging station. In some cases, when the ultrasonic sensors are mounted as in systems 400, 700, and 800, the emitted pulses from the ultrasonic sensor(s) may not get reflected back to the sensor(s). The calibration method for this case is illustrated in FIG. 10, where the probability density function exists only for the case when the said parking space is occupied 1001 by a vehicle and there is no measurement reading available of the time lapse when the parking space is unoccupied. In this case, the threshold $T_i$ 1003 can be chosen as shown in FIG. 10 when the probability density function 1001 becomes weaker or at some time after the mean time lapse 1002 t_occupied$_i$. The probability density function of time lapses of sensor i for this scenario is plotted along Y-axis 1004 and with time lapse 1005 in sensor i plotted long the X-axis. The initial calibration algorithm explained above can also be extended to an automatic self-calibration scheme as explained later.

Figure 11:
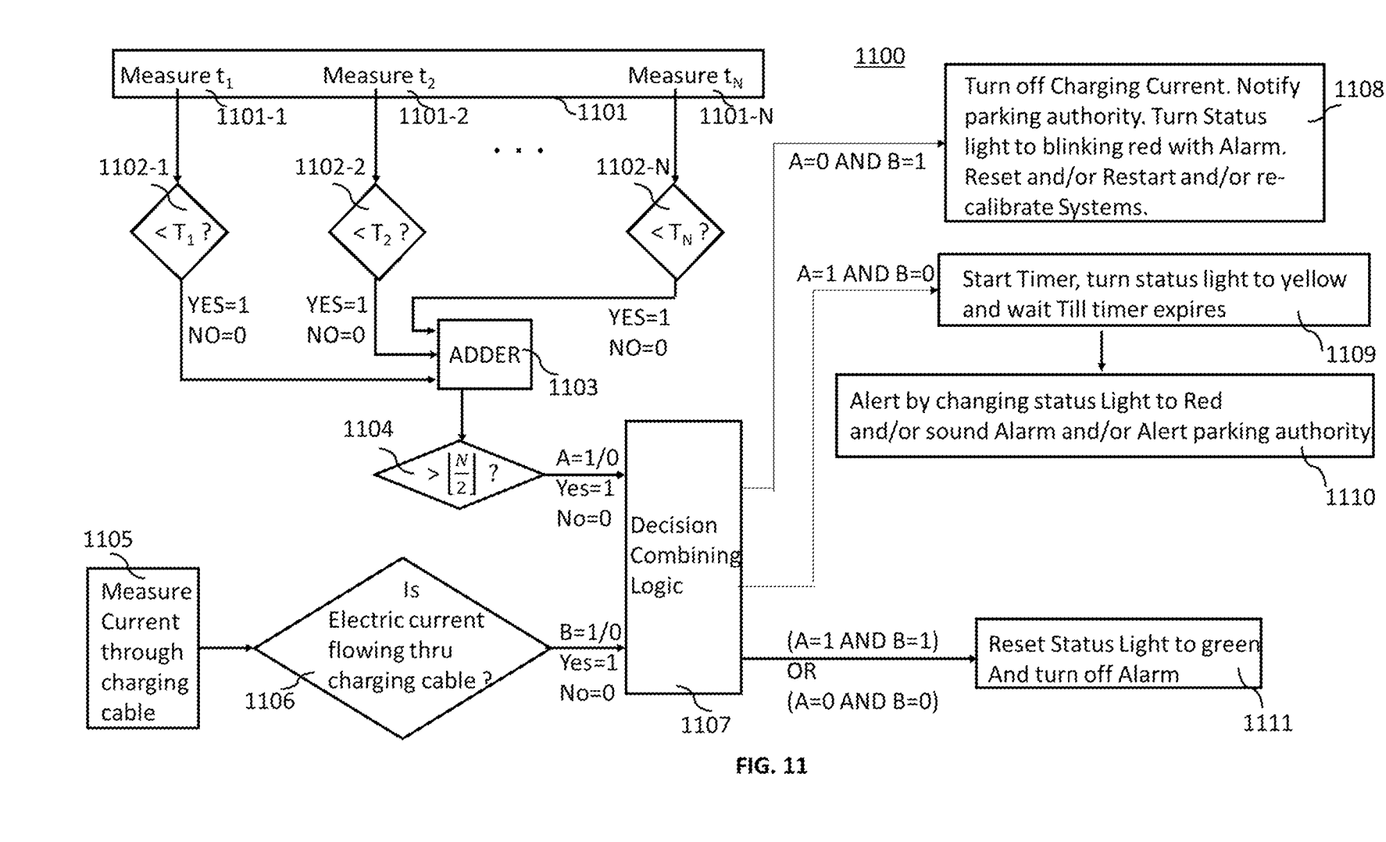
FIG. 11 is a block diagram illustrating the algorithmic steps and logic behind using the information from the ultrasonic sensors and the flow of current through the charging cable for detecting and for taking action when vehicles are parked on the charging station parking spaces for an extended period of time.

FIG. 11 is a block diagram illustrating the algorithmic steps and logic 1100 behind using the information from the ultrasonic sensors for detecting and for taking action when vehicles are parked on the charging station parking spaces for an extended period of time.

After the initial calibration as illustrated and explained in FIGS. 9 and 10, the bank of ultrasonic sensors 1101 are configured and controlled by a machine, such as a microprocessor or a computer to, continuously or in short time intervals, monitor and measure the time lapses of the ultrasonic pulses they transmit to and possibly receive from parked vehicles and/or multiple surfaces of the parking space of interest as shown by 1101-1, 1101-2, . . . , 1101-N in FIG. 11. Let $t_i$ denote the measured time lapse of ultrasonic pulses from ultrasonic sensor i at a given time, where 1-1, 2, 3, . . . , N. If the measured time lapse $t_i$, is less than the chosen threshold $T_i$ for that ultrasonic sensor i, then it can be estimated with high confidence that a vehicle is parked in the said parking space. If the measured time lapse $t_i$, is not less than the chosen threshold $T_i$ for that ultrasonic sensor i, then it can be estimated with high confidence that the said parking space is empty and is not occupied. This condition to detect the presence or absence of a vehicle parked in the said parking space is shown in FIG. 11, by blocks 1102-1, 1102-2, . . . , 1102-N. If the condition $t_i<T_i$ in blocks 1102-1, 1102-2, . . . , 1102-N is true, then the output is assigned to a 1 (YES=1). Otherwise, the output is assigned a 0 (NO=0). By outputting a binary 1 or 0 value, it is possible to do arithmetic and/or Boolean logic operations on those values.

The adder 1103 adds the 1 or 0 outputs from blocks 1102-1, 1102-2, . . . , 1102-N. The sum output from the adder represents the total number of ultrasonic sensors that are estimating that a vehicle is parked in the said parking space of interest. Block 1104 decides whether a vehicle is parked in the said parking space or not based on the majority of the decisions from individual ultrasonic sensors. This majority logic is done by comparing the output of adder block 1103 with half of the number of ultrasonic sensors rounded down as shown in block 1104 using the mathematical floor operation. For example, if there are 5 sensors per parking space, and if the adder output is more than the floor of 5/2 (=2.5), that is if the adder output is more than 2, then block 1104 makes a decision that a vehicle is parked in the said parking space of interest based on the majority of the decisions from the ultrasonic sensors. This decision output from block 1104 is denoted by "A" and is assigned a value of 1 or 0 if the condition in the block 1104 is satisfied (yes=1) or not satisfied (No=0) respectively.

In parallel to deciding whether a parking space is occupied or not by block 1104, the measurement of current through the charging cable is done by block 1105. The block 1105 can also be configured and controlled by a machine, such as a microprocessor or a computer, to continuously or in short time intervals, measure the flow of electric current through the charging cable of the charging station using an instrument, such as an ammeter. Block 1106 decides whether some electric current is flowing through the charging cable or not. The decision output from block 1106 is denoted by "B" and is assigned a value of 1 or 0 if the condition in the block 1106 is satisfied (yes=1) or not satisfied (No=0) respectively.

The decisions from blocks 1104 and 1106 are combined using a decision combining logic block 1107 which works as follows. If decision A is 0 and decision B is 0 (A=0 AND B=0), then it means that the parking space associated with the charging station is not occupied, and current is not flowing through the charging cable. If decision A is 1 and decision B is 1 (A=1 AND B=1), then it means that the parking space is occupied, and electric current is flowing through the charging cable. Either of these conditions (A=0 AND B=0, OR, A=1 and B=1) indicating that the parking space is either available or being occupied by an eligible vehicle, is a valid, authorized and good condition for a vehicle to be parked in the parking space and hence the control from block 1107 goes to block 1111, wherein the status light is reset to green and the alarm is turned off. It is to be understood that if the status light was already green and the alarm was already off, then the block 1111 need not do the reset again. If decision A from block 1104 is 1 and decision B from block 1106 is 0, then it means that some vehicle (electric or non-electric) is parked in the said parking space and electric current is not flowing through the charging cable. When this condition (A=1 AND B=0) is met, then the control from block 1107 goes to block 1109 which begins to take action on the parked vehicle if it is not drawing current and/or if left unattended over a certain period of time, by starting a timer and waiting till the timer expires. This time period serves as a warning to the owner to have the vehicle removed or start drawing electric current. The status light may be turned to yellow, for example, to indicate this event. The duration of the timer could be programmable and reasonable enough for a person to react and move the vehicle away from the parking space. When the timer expires, it indicates that the parked vehicle is no longer eligible to be parked in that space and the control moves to block 1110 which changes the status light to red (indicating that the parking space is occupied by an ineligible vehicle) and/or sounds an audible alarm and/or alerts parking authority, towing companies and/or law enforcement authority. If the vehicle is able to drive on its own, such as an autonomous self-driving vehicle, then the charging station may also release the charging cable and issue a command for the vehicle to move away from the parking space. If the owner information is known, then the charging station may also communicate to the owner by electronic means such as a text message, email, or a telephonic voice call. The final scenario is when the decision A from block 1104 is 0 and decision B from block 1106 is 1. For this condition A=0 AND B=1, it means that although the parking space is detected to be empty and unoccupied, some electric current flow is detected to be flowing through the charging cable. This is a fault condition as electric current is not supposed to flow through the charging cable when there is no vehicle in the parking space. This scenario could happen due to malfunction of some components in the system or when a bad user intentionally tricks the system by not parking a vehicle or parking only a portion of the vehicle in the parking space and/or somehow pulling or extending the cable to steal electricity from the charging station. The scenario can also happen when the sensors are out of calibration as they age. When this condition A=0 AND B=1 happens, the control goes from block 1107 to block 1108, which will turn off charging current to flow through the charging cable. Also, block 1108 may change the status light to blinking red, sound the alarm, and notify a parking authority for maintenance and repair of this fault condition. The system may also be reset and/or restarted and/or re-calibrated (automatic self-recalibration or manual re-calibration) by block 1108.

As the bank of ultrasonic sensors 1101-1, 1101-2, . . . , 1101-N and the current measuring block 1105 are configured to, continuously or in short time intervals, monitor the occupancy of the parking space and the flow of electric current through the charging cable, the decisions A and B and therefore the control from the decision combining logic block 1107 could change, continuously or in short intervals of time as well. Accordingly, the state of the system could change among blocks 1108, 1109, 1110, or 1111 as the control from block 1107 changes.

As the bank of sensors 1101-1, 1101-2, . . . , 1101-N measure the time lapses of the ultrasonic pulses they transmit to and possibly receive from parked vehicles and/or multiple surfaces of the parking space of interest, it is also possible to store those measurement data and recreate the probability density functions (PDFs) as in FIGS. 9 and 10 for the system to self-calibrate later as the system and components, such as the sensors, age over time. This is important as it is known that the electrical properties of different components change over time due to various reasons, such as, the age of the system, the operating temperature, voltage fluctuations, etc. By learning the measurement data over time and recreating the PDFs as in FIGS. 9 and 10, the system can be calibrated (new updated values for t_unoccupied, t_occupied, and $T_i$) either manually or automatically by the system itself (machine learning for self-calibration).

Figure 12A:
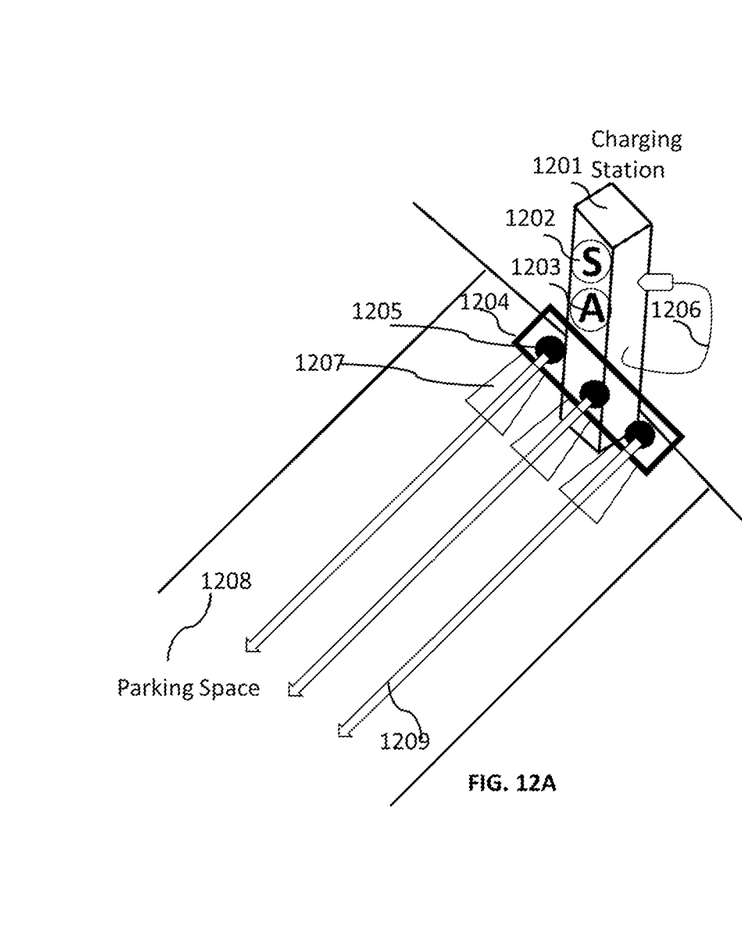
FIGS. 12A and 12B illustrate an embodiment where the ultrasonic sensors are positioned to beam the ultrasonic pulses parallel to the parking space floor for the cases where the ultrasonic sensors are fitted with a conical structure to restrict the field of reception and ultrasonic sensors capable of moving in vertical and horizontal directions, respectively.
Figure 12B:
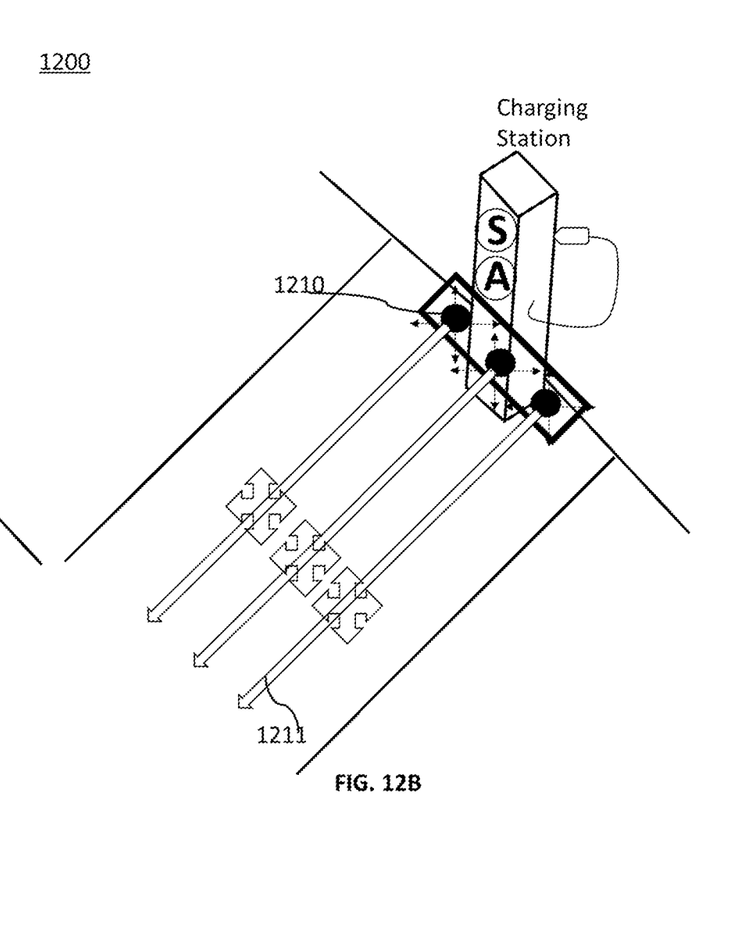

It is to be understood that the embodiments and variations shown and described herein are merely illustrative of the principles of this invention and that various modifications may be implemented by those skilled in the art without departing from the scope and spirit of the invention. For example, some possible modifications to the principles behind the system 1200 of this invention is illustrated in FIGS. 12A and 12B. FIG. 12A illustrates another embodiment of the invention where the ultrasonic sensors 1205 mounted on a structure 1204 are positioned to beam the ultrasonic pulses 1209 parallel to the parking space 1208 floor. The ultrasonic sensors 1205 in this modification are shown to be fitted with a conical structure 1207 which restricts the field of reception by narrowing down the directions from where the reflected ultrasonic pulses can be received from. This is done to possibly reduce false occupancy predictions from unwanted reflections in objects from neighboring parking spaces. As explained before, in FIGS. 4A and 4B, the circled S 1202, denotes a status indicator which indicates the status of the parking space of the charging station 1201 and the circled A 1203 denotes an ammeter device to measure current flow through the charging cable 1206. FIG. 12B is similar to FIG. 12A but with the ultrasonic sensors 1210 capable of rotating and moving in vertical and/or horizontal directions, also referred to as pan-tilt motion, so that the ultrasonic pulses 1211 can scan the vehicle and/or parking space in multiple directions and/or at different angles.

The present invention can be embodied in the form of methods and apparatuses for practicing those methods. The present invention can also be embodied in the form of program code embodied in tangible media, such as CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

What is claimed is:

1. A vehicle charging station system, the system comprising:
   a plurality of first sensor devices for detecting a presence or an absence of a vehicle in a parking space associated with the charging station;
   a second sensor device for detecting a presence or an absence of an electric current flow through a charging cable attached to the charging station;
   a processor configured to:
      receive a corresponding first sensor signal from each of the first sensor devices and a second sensor signal from the second sensor device;
      produce a first decision based on the plurality of first sensor signals, wherein the first decision indicates the presence or absence of a vehicle in the parking space;
      produce a second decision based on the second sensor signal, wherein the second decision indicates the presence or absence of an electric current flow through the charging cable; and
      operate a plurality of audio-visual monitoring devices, a timer and a radio frequency communication module connected to the charging station; and
   a computer readable medium including instructions executable by the processor to:
      select a process based upon a combination of the first decision and the second decision, wherein the process is selected from a group consisting of:
   a first monitoring process, a second monitoring process, a third monitoring process, a fourth monitoring process and a calibration process, wherein:
      the plurality of audio-visual monitoring devices comprises of an alarm and a green light; and
      when the first decision is the presence of a vehicle in the parking space and when the second decision is the presence of electric current flow through the charging cable, the first monitoring process is to turn on the green light and turn off the alarm.

2. The invention of claim 1, wherein:
   the plurality of audio-visual monitoring devices comprises of an alarm and a green light; and
   when the first decision is the absence of a vehicle in the parking space and when the second decision is the absence of electric current flow through the charging cable, the second monitoring process is to turn on the green light and turn off the alarm.

3. The invention of claim 1, wherein:
   the plurality of audio-visual monitoring devices comprises of an alarm and a blinking red light; and when the first decision is the absence of a vehicle in the parking space and when the second decision is the presence of electric current flow through the charging cable, the third monitoring process is to turn off electric current through the charging cable, turn on the blinking red light, turn on the alarm and communicate to a parking authority using the radio frequency communication module.

4. The invention of claim 1, wherein:
the plurality of audio-visual monitoring devices comprises of an alarm,
a red light, a yellow light, and a timer; and
when the first decision is the presence of a vehicle in the parking space and when the second decision is the absence of electric current flow through the charging cable, the fourth monitoring process is to start the timer, turn on the yellow light, wait for the timer to expire, turn off the yellow light, turn on the red light, turn on the alarm and communicate to a parking authority using the radio frequency communication module.

5. The invention of claim 1, wherein:
each of the first sensor devices is an ultrasonic sensor; and
the processor detects the presence or absence of a vehicle in the parking space by:
measuring time lapse between sending and receiving of ultrasonic pulses from each of the ultrasonic sensors;
comparing each of the measured time lapse to a corresponding threshold;
deciding that a vehicle is present in the parking space when a majority of the measured time lapses are below the corresponding thresholds; and
deciding that a vehicle is absent in the parking space when a majority of the measured time lapses are not below the corresponding thresholds.

6. The invention of claim 1, wherein:
the second sensor device is an ammeter;
the processor detects the presence of an electric current flow through the charging cable if the ammeter measures any electric current flow; and
the processor detects the absence of an electric current flow through the charging cable if the ammeter does not measure any electric current flow.

7. The invention of claim 5, wherein:
the threshold is determined during the charging station calibration process, wherein the calibration is done by the processor comprising the steps of:
computing a first probability density function of the measured time lapses by intentionally parking a vehicle in the parking space;
computing a second probability density function of the measured time lapses by intentionally making the parking space unoccupied; and
computing the threshold as the midpoint of the mean values of the first and second probability density functions.

8. The invention of claim 1, wherein the plurality of first sensor devices are ultrasonic sensors which are positioned to beam ultrasonic pulses in a direction selected from a group consisting of:
parallel to the charging station, and perpendicular to the charging station.

9. The invention of claim 8, wherein the ultrasonic sensors are further:
fitted with a conical structure to transmit and receive ultrasonic pulses with reduced spread; and
mounted on a moving structure attached to the charging station, wherein the structure can move in both horizontal and vertical directions.

10. A method for monitoring a vehicle charging station system, the method comprising the steps of:
detecting a presence or an absence of a vehicle in a parking space associated with the charging station by using a plurality of first sensor devices;
detecting a presence or an absence of an electric current flow through a charging cable attached to the charging station using a second sensor device;
configuring a processor to:
receive a corresponding first sensor signal from each of the first sensor devices and a second sensor signal from the second sensor device;
produce a first decision based on the plurality of first sensor signals, wherein the first decision indicates the presence or absence of a vehicle in the parking space;
produce a second decision based on the second sensor signal, wherein the second decision indicates the presence or absence of an electric current flow through the charging cable; and
operate a plurality of audio-visual monitoring devices, a timer and a radio frequency communication module connected to the charging station; and
using a computer readable medium including instructions executable by the processor to:
select a process based upon a combination of the first decision and the second decision, wherein the process is selected from a group consisting of:
a first monitoring process, a second monitoring process, a third monitoring process, a fourth monitoring process and a calibration process, wherein:
the plurality of audio-visual monitoring devices comprises of an alarm and a green light and
when the first decision is the presence of a vehicle in the parking space and when the second decision is the presence of electric current flow through the charging cable, the first monitoring process is to turn on the green light and turn off the alarm.

11. The invention of claim 10, wherein:
the plurality of audio-visual monitoring devices comprises of an alarm
and a green light; and
when the first decision is the absence of a vehicle in the parking space and when the second decision is the absence of electric current flow through the charging cable, the second monitoring process is to turn on the green light and turn off the alarm.

12. The invention of claim 10, wherein:
the plurality of audio-visual monitoring devices comprises of an alarm
and a blinking red light; and
when the first decision is the absence of a vehicle in the parking space and when the second decision is the presence of electric current flow through the charging cable, the third monitoring process is to turn off electric current through the charging cable, turn on the blinking red light, turn on the alarm and communicate to a parking authority using the radio frequency communication module.

13. The invention of claim 10, wherein:
the plurality of audio-visual monitoring devices comprises of an alarm,
a red light, a yellow light, and a timer; and when the first decision is the presence of a vehicle in the parking space and when the second decision is the absence of electric current flow through the charging cable, the fourth monitoring process is to start the timer, turn on the yellow light, wait for the timer to expire, turn off the yellow light, turn on the red light, turn on the alarm and communicate to a parking authority using the radio frequency communication module.

14. The invention of claim 10, wherein:

each of the first sensor devices is an ultrasonic sensor; and
the method of detecting the presence or absence of a vehicle in the parking space,
comprises the steps of:
  measuring time lapse between sending and receiving of ultrasonic pulses from each of the ultrasonic sensors;
  comparing each of the measured time lapse to a corresponding threshold;
  deciding that a vehicle is present in the parking space when a majority of the measured time lapses are below the corresponding thresholds; and
  deciding that a vehicle is absent in the parking space when a majority of the measured time lapses are not below the corresponding thresholds.

15. The invention of claim 10, wherein:

the second sensor device is an ammeter;
the processor detects the presence of an electric current flow through the charging cable if the ammeter measures any electric current flow; and
the processor detects the absence of an electric current flow through the charging cable if the ammeter does not measure any electric current flow.

16. The invention of claim 14, wherein:

the threshold is determined during the charging station calibration process, wherein the calibration is done by the processor comprising the steps of:
  computing a first probability density function of the measured time lapses by intentionally parking a vehicle in the parking space;
  computing a second probability density function of the measured time lapses by intentionally making the parking space unoccupied; and
  computing the threshold as the midpoint of the mean values of the first and second probability density functions.

17. The invention of claim 10, wherein the plurality of first sensor devices are ultrasonic sensors which are positioned to beam ultrasonic pulses in a direction selected from a group consisting of:
  parallel to the charging station, and perpendicular to the charging station.

18. A method for calibrating a vehicle charging station system, the method comprising the steps of:
  using a plurality of ultrasonic sensors connected to the charging station;
  configuring a processor to receive a signal from each of the ultrasonic sensors, wherein the signal is indicative of the time lapse between the sending and receiving of ultrasonic pulses by the ultrasonic sensors;
  using a computer readable medium including instructions executable by the processor to:
    compute a first probability density function of the time lapses when a vehicle is present in a parking space associated with the charging station;
    compute a second probability density function of the time lapses when the parking space is unoccupied;
    compute a threshold as the midpoint of the mean values of the first and second probability density functions; and
  using the computed threshold to calibrate the plurality of ultrasonic sensors.

* * * * *